United States Patent [19]

Betton et al.

[11] Patent Number: 5,296,788
[45] Date of Patent: Mar. 22, 1994

[54] SYSTEM FOR CONTROLLING A MOTOR DRIVEN SWITCH

[75] Inventors: Arnold L. Betton, Kings Beach; Edgar A. Hirzel, Granada Hills, both of Calif.

[73] Assignee: Baton Labs, Inc., Granada Hills, Calif.

[21] Appl. No.: 971,736

[22] Filed: Nov. 4, 1992

Related U.S. Application Data

[63] Continuation-in-part of Ser. No. 679,535, Apr. 2, 1991, Pat. No. 5,200,877, which is a continuation-in-part of Ser. No. 504,238, Apr. 4, 1990, abandoned.

[51] Int. Cl.$^5$ .............................................. H02P 1/00
[52] U.S. Cl. ..................................... 318/283; 318/280
[58] Field of Search ............................... 318/280, 283

[56] References Cited

U.S. PATENT DOCUMENTS

| | | |
|---|---|---|
| 2,709,725 | 5/1955 | Bieber et al. . |
| 2,864,912 | 12/1958 | Schmidt . |
| 2,870,288 | 1/1959 | Schmidt . |
| 3,127,518 | 3/1964 | Pruitt . |
| 3,171,920 | 3/1965 | Klein et al. . |
| 3,172,400 | 3/1965 | Hale . |
| 3,395,288 | 7/1968 | Von Brimer . |
| 3,462,647 | 8/1969 | Russell . |
| 3,474,296 | 10/1969 | Rickey . |
| 3,497,707 | 2/1970 | Stewart . |
| 3,646,354 | 2/1972 | Von Brimer . |
| 3,668,514 | 6/1972 | Peck . |
| 3,763,415 | 10/1973 | Ownby . |
| 3,829,753 | 8/1974 | Marshall . |
| 3,852,732 | 12/1974 | Yorksie et al. . |
| 3,967,133 | 6/1976 | Bokern . |
| 4,017,724 | 4/1977 | Finger . |
| 4,052,717 | 10/1977 | Arnold et al. . |
| 4,088,940 | 5/1978 | Ciarniello et al. . |
| 4,090,122 | 5/1978 | Hoinski . |
| 4,127,782 | 11/1978 | Omura et al. . |
| 4,137,557 | 1/1979 | Ciarniello et al. . |
| 4,149,093 | 4/1979 | D'Alessio et al. . |
| 4,153,869 | 5/1979 | Ragaly . |
| 4,161,684 | 7/1979 | Ragaly . |
| 4,180,770 | 12/1979 | Eby . |
| 4,193,026 | 3/1980 | Finger et al. . |
| 4,259,625 | 3/1981 | Hatakeyama et al. ............. 318/283 |
| 4,282,475 | 8/1981 | Milton . |
| 4,285,305 | 3/1981 | Anglis . |
| 4,357,505 | 11/1982 | Bridges . |
| 4,365,188 | 12/1982 | Walter . |
| 4,388,618 | 6/1983 | Finger . |
| 4,444,067 | 4/1984 | Preuss et al. . |
| 4,445,090 | 4/1984 | Melocik et al. . |
| 4,493,001 | 1/1985 | Sheldrake . |
| 4,509,005 | 4/1985 | Stroud . |
| 4,516,066 | 5/1985 | Nowakowski . |
| 4,733,100 | 3/1988 | Nusairat et al. . |
| 4,782,240 | 11/1988 | Davidson . |
| 4,832,146 | 2/1989 | Luby . |
| 4,902,956 | 2/1990 | Sloan . |
| 4,990,873 | 2/1991 | Grunert et al. . |
| 5,089,762 | 2/1992 | Sloan . |

Primary Examiner—William M. Shoop, Jr.
Assistant Examiner—Karen Masih
Attorney, Agent, or Firm—Willian Brinks Hofer Gilson & Lione

[57] ABSTRACT

A motor driven switch for use in operation between high current electrical systems and low current electrical systems. The motor driven switch includes a control circuit for operating the switch, which includes at least one switch contact movable between electrically open and closed positions. The switch is operated by a reversible direct current motor having a shaft rotatable in opposite rotary directions, upon control of the switch circuitry. The switch contact is operable to conduct high currents, and the direct current motor and associated control circuitry are operative to be controlled by low current systems. In a preferred embodiment, the motor driven switch controls distribution of current within an automotive electrical system.

11 Claims, 6 Drawing Sheets

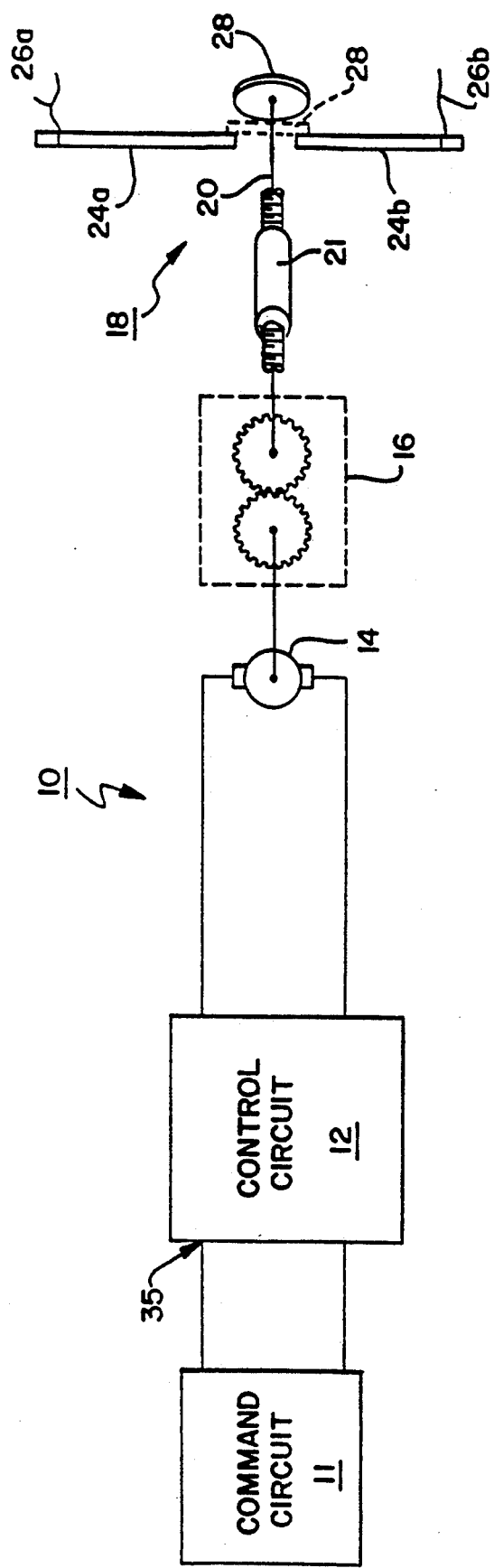

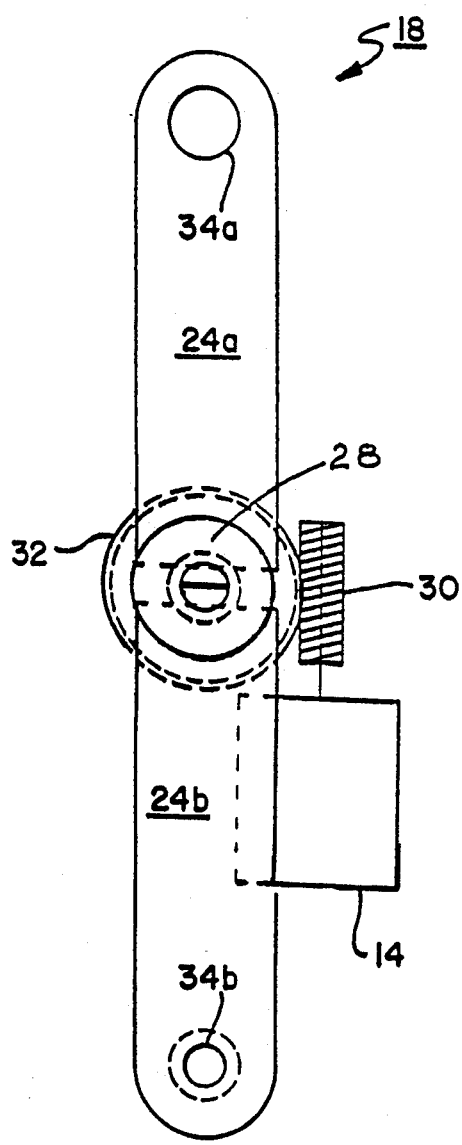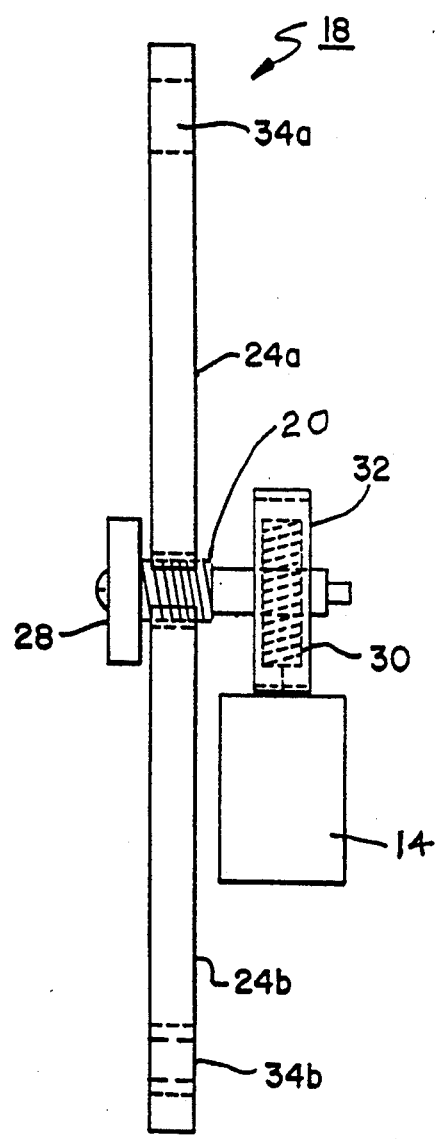

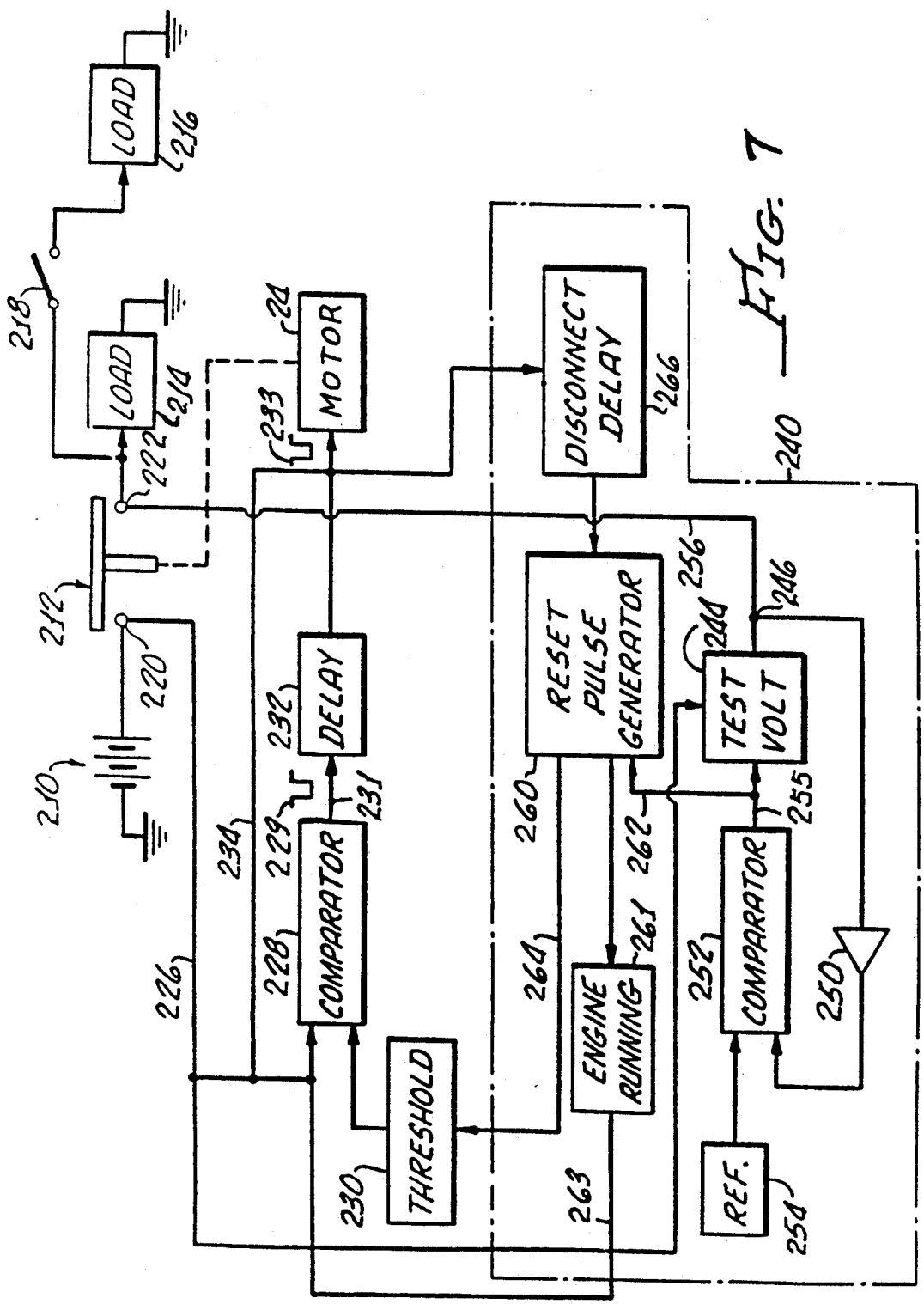

SYSTEM FOR CONTROLLING A MOTOR DRIVEN SWITCH

This is a continuation-in-part of application Ser. No. 07/679,535, filed Apr. 2, 1991, now U.S. Pat. No. 5,200,877, which is a continuation-in-part of application Ser. No. 07/504,238 filed Apr. 4, 1990 which is now abandoned.

FIELD OF THE INVENTION

The present invention relates to a motor driven switch, and more particularly, concerns a system in which high current circuits and loads are controlled by circuitry operating at very low current levels.

BACKGROUND OF THE INVENTION

The advent of solid state circuitry has created a whole new realm of electronics where systems can be controlled and operated by very small amounts of current. This is in contrast to the high current power and electromotive systems that existed for many years prior to solid state circuitry. With the occurrence of solid state circuitry very powerful control and computational systems have been developed to suit the needs of many different industries. However, due to the inherently differing power requirements between solid state circuitry and systems, and the high current power and electromotive systems, the highly efficient controls developed for solid state systems have not been applied to these high current systems.

The problem with applying solid state control to these high amperage systems is bridging the gap between their vastly different power requirements. For example, the power used to operate high current DC systems such as an automotive electrical system is orders of magnitude above the maximum power tolerated by most solid state control circuitry. In an automotive battery, currents in excess of 100 amperes must commonly be supplied to the automobile electrical system. Such high currents would severely damage or destroy most solid state devices.

What is lacking, therefore, is a system that bridges the gap between these inherently differing electrical systems and thus combines the advantages of both. Such a system would apply the highly efficient and stable control and computational advantages of solid state circuitry to the operation of high current power distribution and electromotive systems. Employing solid state circuitry to control these high current systems would provide increased levels of control over their operations. Such a system would preferably provide some form of switch mechanism to bridge the gap between these high power and low power electrical systems.

Attempts have been made in the art to provide such a switch, but have been unsuccessful. For example, U.S. Pat. No. 2,709,725, issued to Bieber, et al. discloses an electronic switch designed to handle relatively high voltages and provide efficient insulation about the switch's contact points to prevent energy leakage. According to the patent, a reversible motor is employed to complete a circuit employing coaxial cables. Through the use of a reversible motor and a threaded shaft the circuit is completed by abutting a coaxial jumper in telescoped relation with the free coaxial leads. The patent, however, does not disclose the use of any solid state circuitry to control the reversible motor.

U.S. Pat. No. 5,089,762, issued to Sloan, discloses a battery disconnect device for use in conjunction with a battery in a motor which is connected to an electrical load. According to the patent, circuitry is employed to detect activation of the engine ignition system, which actuates a switch. A DC motor is employed to drive a shaft coupled to a contact plate that makes or breaks electrical connection. However, the patent does not disclose the use of any solid state control circuitry to control the motor operated switch.

It is therefore an object of the present invention to provide a switch to bridge the power gap between high amperage circuits and low amperage circuits.

It is also an object of the invention to employ solid state circuitry to control high current power distribution and electromotive systems.

It is further an object of the invention to provide a motor driven switch to control operation of an automotive electrical system.

It is yet another object of the invention to provide a solid state control circuit for the control of an external high current electrical system.

SUMMARY OF THE INVENTION

In view of the above, there is provided a control circuit for a motor driven switch wherein the switch includes at least one switch contact movable between electrically closed and electrically open positions. A reversible direct current motor having a shaft rotatable in opposite rotary directions is coupled to the switch. Means for operating the at least one switch contact is for electrically opening and closing the switch is also connected to the motor shaft. The means for operating the switch contact is responsive to rotation of the shaft in opposite rotary directions. Command circuit means are provided that are responsive to a first condition for generating a first signal and a second condition for generating a second signal. Control circuit means responsive to the first signal for driving the shaft in a first rotary direction and responsive to the second signal for driving the shaft in the second rotary direction is also provided. Thus, the motor driven switch is controlled by electrical signals to operate between open and closed positions.

In one preferred embodiment of the invention, the at least one switch contact is operative to conduct at current in excess of 100 amperes, and as high as 800 amperes. In this preferred embodiment, the direct current motor is operative to be controlled by currents of less than 1 ampere and may be in the order of approximately 250 milliamperes.

According to the invention, a motor driven switch is provided to bridge the power differences between high amperage electrical circuits and low amperage control circuitry. The invention thus allows the precise control provided by solid state circuitry to be employed with high current power distribution and electromotive systems. In the preferred embodiment, the invention advantageously provides the very precise operation of solid state circuitry to control the distribution of electrical current through an automotive electric system.

These and other advantages will be apparent upon consideration of the following detailed description of the presently preferred embodiments of the invention, taken in conjunction with the appended drawings.

DESCRIPTION OF THE DRAWINGS

FIG. 1 is a diagrammatic illustration of a motor driven switch system made according to the invention;

FIG. 2A is a top view of the gear train showing the contact plates and worm gear;

FIG. 2B is a side view of the gear train showing the contactor;

FIG. 7 is a block diagram of a command circuit for use with a system employing the principles of the present invention.

DETAILED DESCRIPTION OF THE PRESENTLY PREFERRED EMBODIMENTS

Figure 3A:
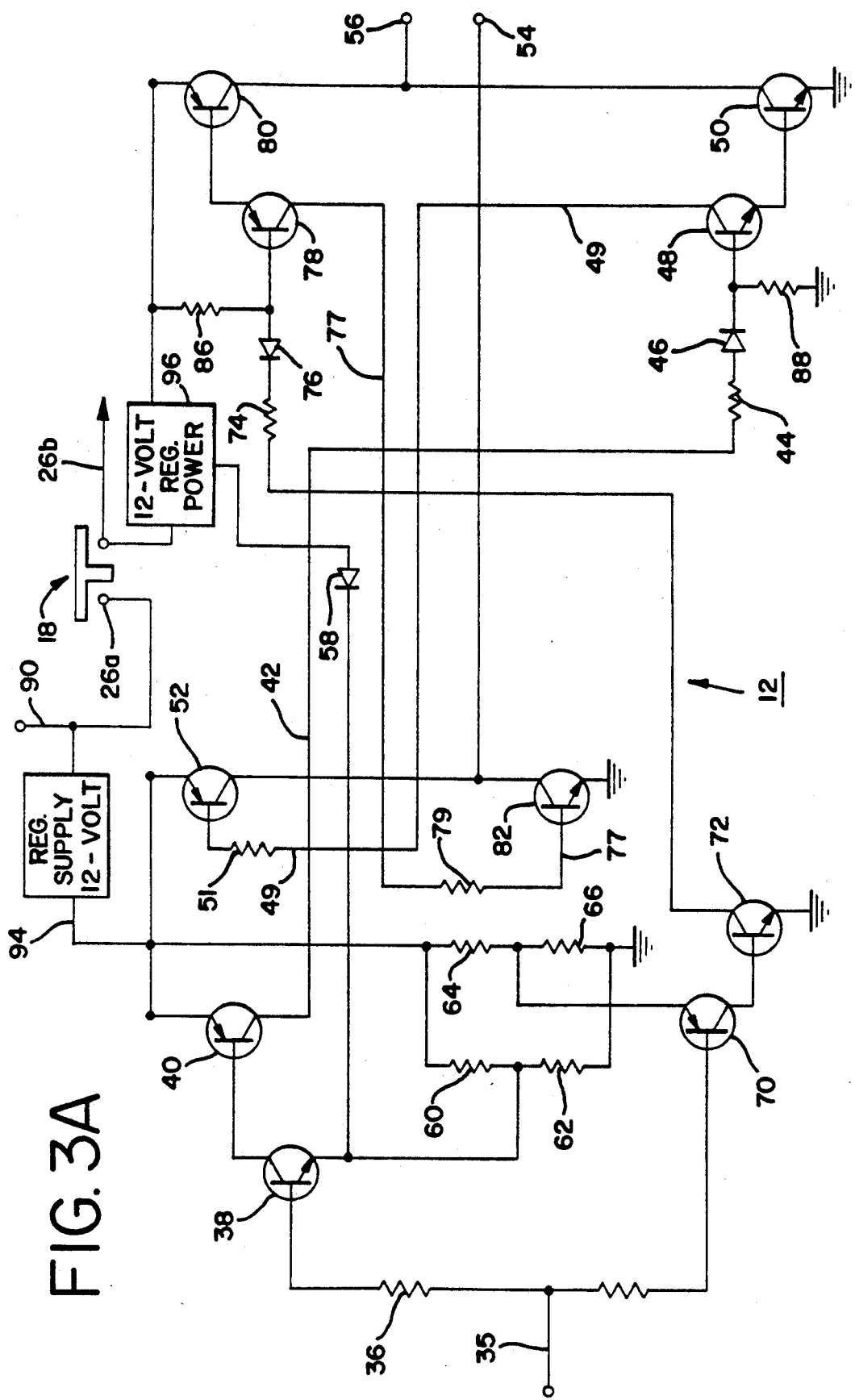
FIGS. 3A and 3B illustrate alternate embodiments of the preferred control circuitry for operating the motor driven switch system shown in FIG. 1.

Referring now to the drawings, there is shown in FIG. 1 one presently preferred embodiment of a motor driven switch system 10. As illustrated in FIG. 1, the motor driven switch system 10 includes a command circuit 11, and a control circuit 12 coupled to a motor 14. The control circuit 12 is used to drive the motor 14 in either a clockwise or counterclockwise direction in response to a first or second signal from command circuit 11. For example, a high voltage signal from the command circuit 11 will cause the control circuit 12 to drive the motor 14 in one direction; and a low voltage signal from command circuit 11 will cause the control circuit to drive the motor 14 in the opposite direction.

A command circuit 11, of a type that could be used with this invention is illustrated in FIG. 7. This command circuit 11 is responsive to a first condition for generating a first signal, is responsive to a second condition for generating a second signal and includes a timer for generating a timer output signal. The command circuit 11, of FIG. 7, includes a vehicle battery 210 connected through a normally closed main switch 212 to an unswitched load 214, and to a switched load 216, which is under control of an ignition switch 218. Load 214 may include, for example, headlights, radio, and the like. Load 216 may be, for example, the starter motor and starter solenoid. The standard vehicle electrical system connects the battery to loads 214 and 216 directly without interposition of the main switch 212. To apply the system of the present invention in a conventional vehicle electrical system, it is only necessary to connect the main switch 212 between one battery terminal, such as the positive terminal, and the loads, as shown in FIG. 7.

The switch 212 connects or disconnects terminals 220 and 222 according to the switch condition as determined by a motor 14. With the switch 212 in a closed position, the terminals 220, 222 are connected to one another, and the battery is thus connected to the load. When the switch is driven to the open position, the terminals 220, 222 are disconnected and the loads are disconnected from the battery.

Battery voltage at the positive switch terminal 220 is sensed through line 226 and is connected as a first input to a comparator 228. A second input to the comparator 228 is provided from a reference or threshold voltage generator 230. The comparator 228 provides a low output 229 or first signal on line 231 when the sensed battery voltage or first condition at terminal 220 falls below the threshold determined by the threshold voltage generator 230.

The comparator output 229 is connected through a delay circuit or timer 232, which provides a fault signal 233 to the motor 14, to open the main switch 212 after the sensed voltage has remained below the threshold for the delay period. Generation of the fault signal 233 will occur if the voltage drops below the threshold for the duration of the delay period regardless of the size of the load causing the condition. The comparator output 229 is thus a function of time alone, and is independent of the size of the voltage drop below the threshold.

Delay Circuit 232

In normal operation when the vehicle is started by engaging the ignition switch 218, the sensed voltage on line 226 will drop as the starter solenoid and starter motor (not shown) draw current from the battery 210. This sensed voltage drop would normally cause the main switch 212 to open. However, the delay circuit 232, which initiates its delay interval when the low battery output 229 occurs, is interposed between the comparator 228 and the switch 212 to inhibit delivery of the fault pulse 233 for the delay period. If the fault signal 233 was not delayed, operation of the starter would result in a drop in voltage at the battery, and the low battery voltage signal 229 would be provided at the output of comparison circuit 228.

A delay period of fifty-five to sixty seconds should be long enough to cover the time normally required to start the vehicle by operation of the ignition switch 218. Thus, a sensed voltage drop due to normal starting operation will not inadvertently open the main switch 212. The output of the comparator 228 appearing on line 231 will rise to disable the delay circuit 232 prior to the end of the delay period. Accordingly, the delay circuit will not time out, and the disconnect signal will not be transmitted to the motor 14. On completion of the starting operation, the starter motor is disconnected so the battery voltage will return to its normally higher level.

Should the low voltage sensed on line 226 result from a drain on the battery so that the battery voltage remains in a lowered condition for longer than the delay period, the delay circuit 232 will time out and provide the fault signal 233 to the motor 14. This operation causes the main switch 212 to open and disconnect the loads from the battery. When the loads are disconnected, there is no further drain on the battery.

Upon disconnection, voltage across the terminals 220, 222 will begin to increase, and within several minutes will attain the open circuit voltage of the battery. The open circuit voltage, however, may be above the threshold voltage of circuit 230. Thus, this increase in voltage may cause the output 229 of the comparator 228 to rise and result in reapplication of the loads. In order to prevent such cyclical operation, a hysteresis feedback signal is provided on line 234 to the voltage sensing input of the comparator 228 to maintain the input at a value below the threshold. This feedback prevents closing the main switch 212 and thus avoids repetitive off and on cycling.

Reset Circuit 240

System reset circuitry 240 is preferably provided to continuously test the disconnected load and sense a change in load caused by an attempted restart of the vehicle. A test voltage generator 244 is connected across the main switch 212 and is supplied with power from the positive terminal 220. The test voltage generator 244 employs a closed loop, negative feedback arrangement to establish a small test voltage at its output on line 246. A preferred value for such test voltage is about 3 millivolts.

The closed loop arrangement maintains a relatively stable voltage on line 246 over a wide range of loads. The voltage on line 246 is connected through an amplifier 250 to a comparison circuit 252. The comparison circuit 252 compares the amplified voltage on line 246 to a reference voltage established by a reference circuit 254. The difference between the feedback voltage on line 246 and the reference voltage appears as an output on line 255 from the comparison circuit 252. The output on line 255 serves as an input to the test voltage generator 244 to vary the value of the voltage generated by minimizing changes in the voltage on line 246. This negative feedback stabilizes the test voltage at a small value over a wide range of loads.

The test voltage on line 246 is applied to both loads 214, 216 through line 256 and through terminal 222 of the main switch 212. This small voltage is applied to the loads 214, 216 while they are disconnected from the battery 210 and after the main switch 212 has been opened due to an inadvertent battery drain.

Operation of the ignition to start the vehicle will close ignition switch 218 and will connect the starter solenoid (load circuit 216) momentarily in parallel with the small cold resistance of load 214. Closing ignition switch 218, therefore, causes a very small change in resistance across load 214, which changes the voltage seen on line 246. This change in voltage causes an output or second condition to appear on line 255 from comparison circuit 252. This output or second condition is coupled through line 262 to a reset pulse generator 260. The reset pulse generator 260 provides a reset or second signal to the threshold circuit 230. The reset or second signal operates to lower the threshold voltage at the second input of comparator 228, and as a result resets the delay circuit 232, thus removing the fault pulse. Removal of the fault pulse causes driver 224 to close the disconnected main switch 212.

Operation of the ignition switch 218 is sensed by the reset circuit 240, which engages the motor 14 to substantially immediately close main switch 212. Closing switch 212 is preferably accomplished in less than one second. The operation is such that the vehicle driver is not aware of any delay or difference in operation, and is able to start the vehicle in a normal manner.

Disconnect Delay Circuit 266

When a low battery voltage has been detected and has remained in excess of the delay period, switch 212 is opened and the voltage at terminal 222 begins to decay rapidly. The reset circuit 240 would normally sense this drop in voltage and generate a reset pulse to immediately close switch 212. If this were allowed to happen, the system would repetitively cycle on and off. To avoid such recycling, the reset pulse generator 260 must be inhibited for a selected period of time (on the order of several seconds) by means of a disconnect delay circuit 266 triggered by the occurrence of the fault signal 233. Thus, the reset circuit is effectively isolated from the threshold circuit for a short period of time after the main switch 212 is opened.

After the main switch 212 has remained open for several seconds, the voltage at terminal 222 becomes relatively stable, and the reset pulse generator 15 is again allowed to operate until the ignition switch is reengaged. Thereafter, a valid reset pulse quickly closes switch 212 and allows current from the battery to be supplied to the starter solenoid.

Engine Running Circuit 261

The protection circuitry discussed so far will operate whenever the battery voltage falls below the predetermined threshold, whether this occurs while the vehicle is parked or while the engine is running. However, for most applications it is not desirable to disconnect the loads from the battery while the engine is running. If the battery voltage should drop below the threshold while the engine is running, the main switch 212 will open. If the alternator is not operating to provide electrical power during such occurrence, the vehicle engine would simply stop. Accordingly, an engine running signal is preferably provided by means of an engine running circuit 261, which raises the sensed battery signal and prevents generation of the fault signal.

The engine running circuit 261 operates by sensing a ripple or slight variation in current through the load due to either alternator or ignition operation, and raises the sensed battery signal at the input to comparator 228. The ripple from the alternator or ignition is amplified through a high gain amplifier consisting of a series of operational amplifiers. The high gain amplifier magnifies this ripple into approximately a 212 volt square wave. The square wave is then connected to a pulse pump circuit that serves to maintain a voltage above the threshold level at the input to the comparator 228.

In the preferred embodiment, the motor 14 is a direct current motor, but as those skilled in the art will appreciate the motor 14 can comprise other machines employing electromotive force. The motor 14 of FIG. 1 is configured to drive a gear train 16 that operates a switch 18. The switch 18 includes a threaded shaft 20 that cooperates with a threaded bore 22 in stationary member 21. The stationary member 21 could be the adjacent edges of the contact plates 24a, 24b or it could be a part of the housing for the motorized switch. The shaft 20 supports movable switch plate 28, so that when shaft 20 is rotated in one direction the movable switch plate is moved to close the gap between contact plates 24a, 24b, as shown by dotted lines in FIG. 1. When rotated in the opposite direction shaft 20 moves plate 28 away from contacts 24a, 24b to open the switch as shown in full lines in FIG. 1. The contact plates 24a, 24b are coupled to an external high-current circuit, preferably via cables 26a, 26b.

A more detailed illustration of the gear train 16 appears below in FIGS. 2A and 2B. As illustrated in FIG. 2A, the motor driven switch system 10 includes a pair of bus bars or contact plates 24a, 24b, which are employed to connect to the external high-current circuit. Also shown in FIG. 2A is the motor 14 employed to open and close the switch 18. Attached to the shaft of the motor 14 is a worm gear 30. The motor 14 is operable thus to drive the worm gear 30 in either clockwise and counterclockwise directions. Mechanically coupled in gear train fashion to the worm gear 30 is a driven gear 32. The driven gear is used to establish electrical contact between the contact plates 24a, 24b by movable switch plate contact 28.

Referring now to the switch 18, as illustrated in FIG. 2B, the driven gear 32 is rigidly attached to the threaded shaft 20. The threaded shaft engages threads formed in the facing edges of contact plates 24a and 24b. A movable switch plate 28 is attached on the opposite end of the threaded shaft 20 from the driven gear 32. Rotation of driven gear 32 by worm gear 30 causes an axial movement of threaded shaft 20 and a corresponding axial movement of switch plate 28 toward and away from contact plates 24a and 24b. As can be best seen in FIG. 2B, driven gear 32 has sufficient width, to move axially, to open and close the small gap between switch plate 28 and contact plates 24a and 24b, while remaining in driven contact with worm gear 30. The movable plate 28 makes and breaks the electrical connection between the contact plates 24a, 24b. Thus, as the worm gear 30 is driven in a first direction by the motor 14, the threaded shaft 20 also rotates in a first direction thereby opening the physical connection between the switch plate 28 and the contact plates 24a, 24b. When the worm gear 30 is driven in a second direction by the motor 14, the threaded shaft 20 rotates in a second direction opposite from the first direction and closes the physical gap between the contact plates 24a, 24b with movable switch plate 28.

Also shown in FIGS. 2A and 2B are mounting holes 34a, 34b provided at the outer ends of the contact plates 24a, 24b. The mounting holes 34a and 34b are employed to couple the motor driven switch system 10 to the high-current electrical system. In the preferred embodiment, the mounting holes 34a, 34b are employed to couple the motor driven switch system 10 to an automobile electrical system (not shown).

Referring to the detailed circuit diagram shown in FIG. 3A, a presently preferred embodiment of the control circuit 12 of FIG. 1 is illustrated. As shown in FIG. 3A, a voltage source 90 and voltage regulator 92 are connected to a first terminal 26a of the switch 18. In the preferred embodiment, the first terminal 26a is coupled to the positive terminal of a lead-acid storage battery used in an automotive electrical system. The output from the voltage regulator 92 provides the voltage to operate the control circuit of FIG. 3A.

The direction indication to open or close the switch 18, however, is provided at input line 35. Preferably, the input signal appearing at line 35 is in the form of a square wave, although other equivalent waveforms will also work. The input waveform at line 35 is supplied by any suitable command circuit or controller 11 to perform the operations necessary for the motor driven switch system 10. Such controllers are user specific and depend upon the desired functionality of the overall system. An example of one such controller is provided in co-pending application Ser. No. 07/679,535, the contents of which are incorporated herein by reference.

In the preferred embodiment of the invention, a high signal from the command circuit 11 at input 35 drives the switch contactor 22 to open the electrical connection between the contact plates 24a, 24b (FIG. 1). This high signal can be provided in response to the occurrence of a first condition, such as low battery condition in the automotive electrical system of the preferred embodiment. Conversely, a low signal causes the contactor 22 to be brought in electrical contact with the contact plates 24a, 24b, thus allowing current to flow in the high-current external circuit. The low signal arises in response to a second condition, such as vehicle ignition in the preferred embodiment of the invention.

A high voltage appearing at line 35 is connected through resistor 36 to NPN transistor 38 and causes the switch 18 to close, thereby completing the high current circuit. Transistor 38 drives PNP transistor 40, which has its emitter coupled to the output 94 of the voltage regulator 92 and its collector connected through line 42, resistor 44 and diode 46 to the base of PNP transistor 48. Transistor 48 has its emitter connected to the base of a PNP power transistor 50. The collector of transistor 48 is connected through line 49 and resistor 51 to the base of a second PNP power transistor 52, which has its emitter connected to the output 94 of the voltage regulator 92.

A high signal at line 35 turns on transistor 38, which activates transistors 40, 48, 50 and 52. When transistors 40, 48, 50 and 52 conduct, current flows from the voltage regulator 92 through transistor 52 to a first motor terminal 54. The path continues through the motor 14, through a second motor terminal 56, and then through power transistor 50 to ground. This flow of current causes the motor 14 to operate in a first direction to close the switch 18. With the switch 18 closed, terminal 26b receives the system voltage, which is coupled through a second voltage regulator 96 and is transmitted through diode 58 to the emitter of transistor 38. The voltage from the second voltage regulator 96 cuts off transistor 38, as well as transistors 52 and 50 of the motor drive circuit.

While the switch 18 is closed, the motor driven switch system 10 is in a steady state condition. In this condition, the high current electrical system under control will operate as if the motor driven switch system 10 were absent. In the preferred embodiment controlling an automotive electrical system, therefore, battery loads, lights, ignition and the like can be applied with no effect on the motor driven switch system 10 since the alternator will provide power to these loads.

Should it be desired to open the switch 18, as the result of a control or fault condition or the like, the user specific controller will provide a low input at line 35. This low input is connected to the base of PNP transistor 70, which begins to conduct, thus turning on NPN transistor 72. The collector of transistor 72 is connected through resistor 74 and diode 76 to the base of PNP transistor 78, which has its emitter connected to the base of a PNP power transistor 80. The collector of transistor 80 is connected to the second motor terminal 56. The collector of transistor 78 is connected through line 77 and resistor 79 to the base of an NPN power transistor 82. The collector of power transistor 82 is connected to the first motor terminal 54.

Accordingly, a low signal from command circuit 11 at the input line 35 will turn on transistors 70, 72, 78, 80 and 82. Turning on these transistors causes current to flow from the second voltage regulator 96 through power transistor 80, through the motor 14 from terminal 56 to 54 (which is opposite the direction of current flow when the switch 18 is open), and then through transistor 82 to ground. This flow of current reverses the direction of motor operation to drive the switch contactor 28 away from the contact plates 24a, 24b (terminals 26a, 26b) and disconnect the high-current circuit under control from the motor driven switch system 10.

While the switch 18 is open, voltage no longer appears at terminal 26b, and there is no drive current through transistor 80 to the remainder of the control circuit 12. Further energization of the motor 14 is stopped as soon as the switch 18 is opened. Resistor 86, connected between the base of transistor 78 and terminal 26b, and resistor 88 connected between ground and the base of transistor 48, provide bypass paths to ensure that the power transistors are cut off in their non-operative states. This precludes the possibility of simultaneously engaging opposite sets of transistors to drive the motor 14 in opposite direction.

Preferably, transistors 38 and 70 are back biased by a circuit including resistors 60, 62, 64 and 66 connected to provide a positive potential from the voltage regulator 92 to the emitters of these transistors. This back bias circuit prevents any ambiguous states, which might otherwise engage both transistor 38 and transistor 70 at the same time.

Table 1 below includes a list of suitable components for some of the elements described above.

TABLE 1

| ELEMENT | PREFERRED COMPONENT |
|---|---|
| Motor 14 | Mabuchi FK130RH or equivelent |
| Transistor 38, 72 and 48 | 2N3904 NPN Transistor |
| Transistor 40, 70 and 78 | 2N3906 PNP Transistor |
| Transistor 52 and 80 | 2N5401 PNP Transistor |
| Transistor 50 and 82 | 2N5551 NPN Transistor |

Figure 3B:
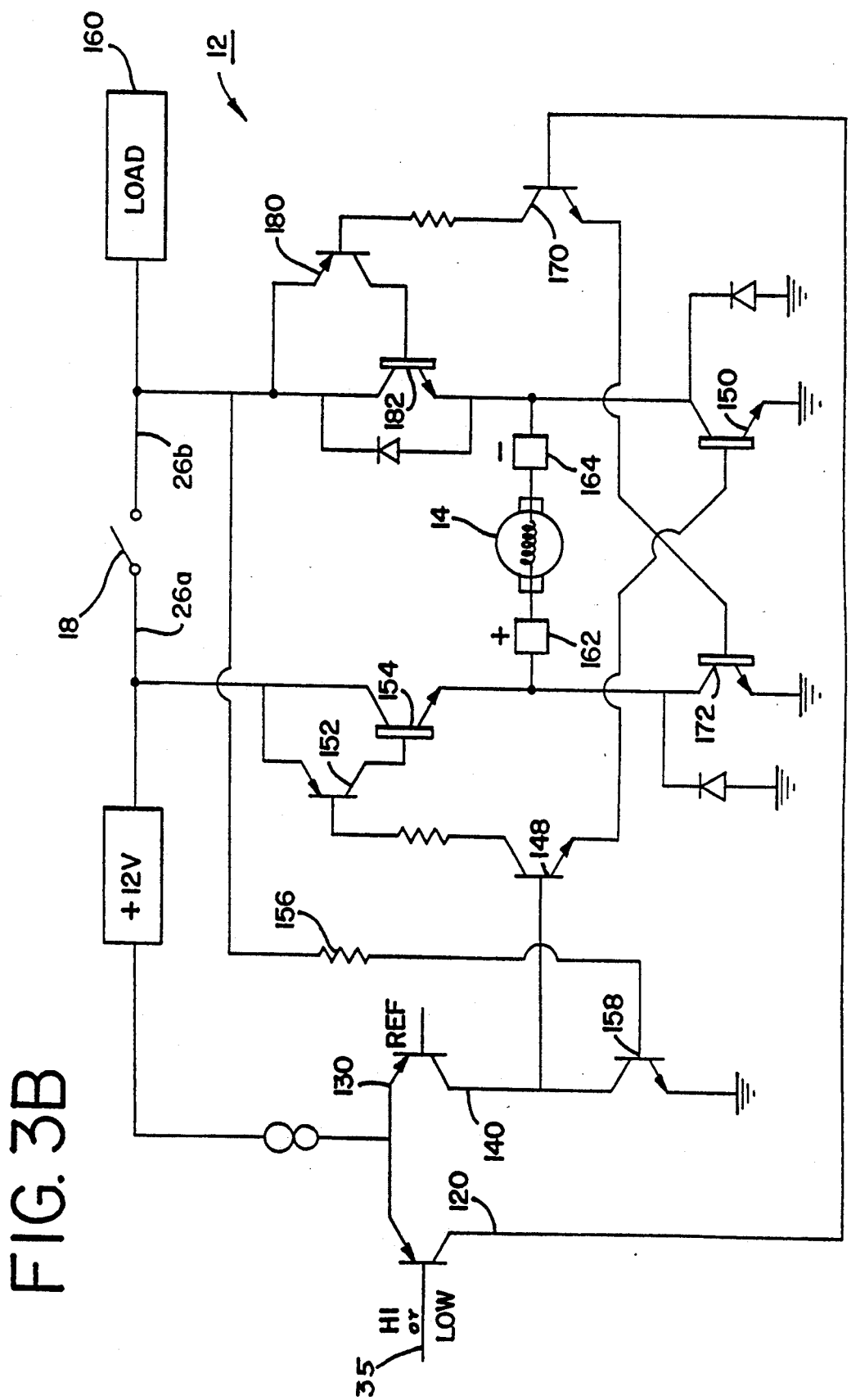

The circuit shown in FIG. 3B is a second preferred embodiment of the control circuit 12 shown in FIG. 3A. The control circuit 12 shown in FIG. 3B has been prepared in order to implement the control circuit 12 in a single semiconductor integrated circuit. This second preferred embodiment was developed due to the difficulty of manufacturing integrated circuits employing PNP transistors as shown in FIG. 3A. The second preferred control circuit 12 thus replaces the complementary transistor pairs of FIG. 3A with Darlington drive circuitry.

In FIG. 3B, either a high or a low voltage input enters the base of PNP transistor 120 from input line 35, in a similar manner to that described above in connection with input line 35 (FIG. 3A). In order to close the switch 18, a high voltage input is provided and transistor 120 is turned off. The current from the source of transistor 120 drives NPN transistor 130, which has its base coupled to a reference voltage source such as resistors 60, 62, 64, 66 of FIG. 3A. Node 140 of FIG. 3B, therefore, is high and NPN transistor 148 conducts as does its Darlington pair transistor 150. The collector of transistor 148 also causes the transistor pair 152, 154 to conduct. Current flowing through transistor pair 152, 154 and through NPN transistor 150 causes the current to flow through the motor 14 through terminals 162 and 164 in the first direction described above. Current flowing in this direction causes the motor 14 to close switch 18.

With the switch 18 closed there is potential at the load 160, which turns on transistor 158 pulling node 140 low, thus turning off transistor 148 and stopping the motor 14. When the switch 18 is closed, the control circuit 12 is in its steady state condition and the high current electrical system will operate as if the switch system was not present.

A low voltage appearing at the base of PNP transistor 120 causes it to conduct. Current from the collector of transistor 120 activates NPN transistor 170. Current flows from the emitter of NPN transistor 170 to the base of NPN transistor 172 causing it to conduct. The current flowing into the collector of transistor 170 also causes the Darlington transistor pair 180, 182 to conduct. (This Darlington transistor pair 180, 182 replaces the complementary pair 78, 80 of FIG. 3A and draws slightly less power from the motor.) Conduction of transistor pair 180, 182 and transistor 172 causes current to flow in the opposite direction across the motor 14. Flow of current in the reverse direction causes the motor 14 to operate in the reverse direction, which drives the switch contactor 28 away from the contact plates 26a, 26b (FIG. 1). The switch 18 is thus opened and power transistor 180 is cut off thereby turning off the motor 14.

The operation of the control circuit 12 of FIG. 3B is essentially the same as that of FIG. 3A. When the switch 18 is open there is an air gap between the contactor 28 and the contact plates 26a, 26b. A high input at the base of transistor 120 causes the motor 14 to run in its forward direction, and the switch 18 is closed. The motor 14 turns the worm gear 30, which turns the threaded shaft 20 causing the contactor 28 on the end of the threaded shaft 20 to connect with the contact plates 24a, 24b. When the control circuit 12 receives a low input at the base of transistor 120, the motor 14 runs in the reverse direction. The switch 18 is then opened since the motor 14 turns the worm gear 30, which rotates the threaded shaft 30 causing the contactor 28 to move away from the contact plates 24a, 24b.

When a high voltage signal is received at transistor 120, the control circuit 12 causes the motor to run in the forward direction which closes the switch 18. While the switch 18 is closed, the control circuit 12 is in a steady state condition. The external high current system will operate as if the motor driven switch system 10 were absent. If, however, the voltage appearing at transistor 120 drops below the cutoff voltage of the transistor, the control 12 circuit receives a low signal which it uses to drive the motor 14 in the reverse direction and open the switch 18. While switch 18 is open, the external high current circuit under control is shut off.

As those skilled in the art will appreciate, the control circuit 12 illustrated in FIGS. 3A and 3B can be used to control external circuits of varying power requirements. The voltage regulators 92, 96 illustrated in FIG. 3A are thus employed to divide the system voltage that powers the external circuit. The components listed above in Table 1 are designed for the preferred embodiment of the control circuit 12, which operates at 12 volts DC. If the system voltage for the external circuit were also 12 volts, the voltage regulators 92, 96 would not be necessary. Such a system would comprise the preferred embodiment automotive electrical system, which operates at 12 volts DC. The control circuit 12 can also be employed with the newly popular electric vehicles, which operate typically at 36 or 48 volts. In embodiments of higher or lower voltage, therefore, the voltage regulators 92, 96 of FIG. 3A would be required.

Figure 4:
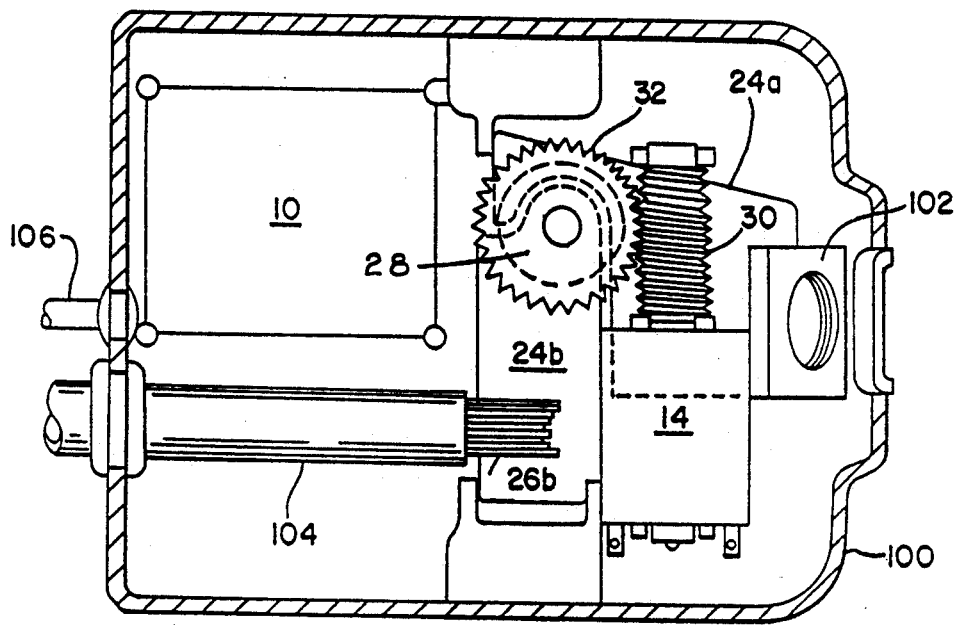
FIG. 4 is a top view of one presently preferred motor driven switch housing for use with the motor driven switch system shown in FIG. 1.
Figure 5:
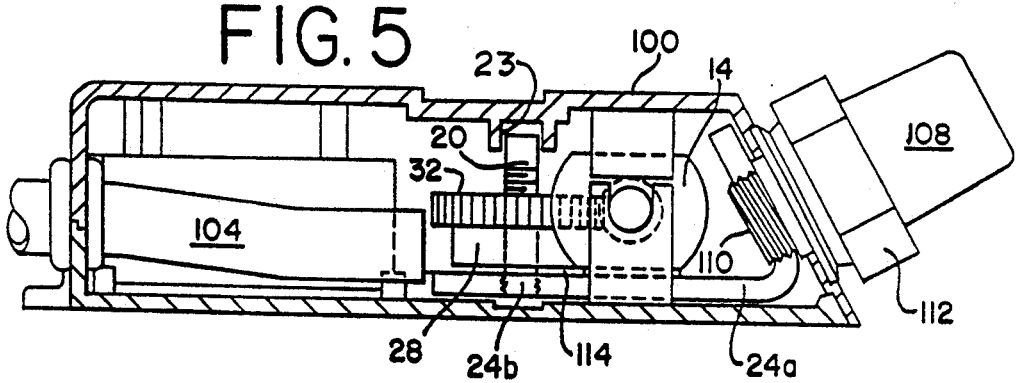
FIG. 5 is a side view of the housing shown in FIG. 4 illustrating the contactor in open-circuit relation with the contact plates.
Figure 6:
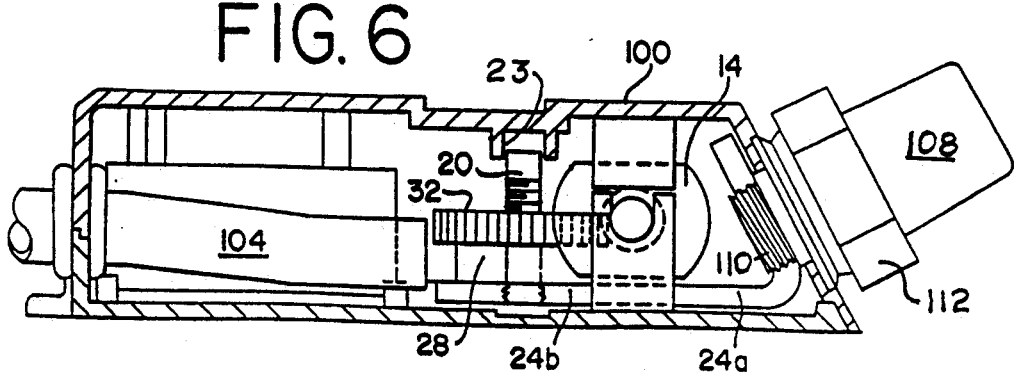
FIG. 6 is a second side view of the housing shown in FIG. 4 illustrating the contactor completing the electrical connection between the contact plates.

Referring now to FIGS. 4–6, a preferred embodiment of a housing 100 for the motor driven switch system 10 is shown. In the preferred embodiment, the housing 100 is employed to couple the motor driven switch system 10 to the automotive electrical system. As illustrated in FIG. 4, the motor 14 drives the gear train 16 which is comprised of worm gear 30, which is in mechanical engagement with driven gear 32. The driven gear 32 is rigidly coupled to the threaded shaft 20. The contact plates 24a, 24b are also shown in FIG. 4. As best seen in FIGS. 5 and 6 the lower end of threaded shaft 20 is received in a threaded bore 22 formed in contact plate 24b. The upper end of threaded shaft 20 is received in an unthreaded bore 23 formed in the housing 100. The unthreaded bore 23 functions as a guide for threaded shaft 20. It should be noted that bore 23, although disclosed as being an unthreaded guide, could be threaded and cooperate with threaded bore 22 to cause axial movement to threaded shaft 20.

A threaded receptacle 102 is also formed at the outer end of the first contact plate 24a to facilitate connection of the motor driven switch system 10 to the electrical system of the automobile. In the preferred housing 20 shown in FIGS. 4-6, a battery terminal lug nut 108 is connected to the contact plate 24a, as shown in FIG. 5. The lug nut 108 includes a threaded end 110 which mates with the threaded receptacle 102 provided in the housing 100. As those skilled in the art will appreciate, a hexagonal flange 112 is provided on the lug nut 108 to enable its attachment to and removal from the housing 100. To further facilitate connection to the automobile, a cable housing 104 and a ground wire 106 are provided to connect the motor driven switch system 10 to the automotive electrical system.

As shown in detail in FIG. 5, when the contactor 28 is not in physical connection with the contact plates 24a, 24b a small air gap 114 appears. The air gap 114 is present, therefore, when the switch 18 (FIG. 1) is in the open position. As shown in FIG. 6, when the motor 14 drives the gear train 16, the threaded shaft 20 moves the movable switch plate 28 in physical and electrical connection with the contact plates 24a, 24b and the air gap 114 closes. Thus, as the threaded shaft 20 is displaced vertically by the gear train 16, the contactor 28 makes or breaks electrical connection with the contact plates 24a, 24b.

There has been described a system that enables the control of high powered electrical systems through the employ of low power electrical circuitry. Such a system can be used to more efficiently and accurately control such high powered systems. In the preferred embodiment, the use of solid state circuitry is advantageously employed to control the high current demands of an automotive electrical system.

The operation of the foregoing should be apparent from the foregoing. Referring to FIG. 1, the command circuit sends a command signal to the control circuit. In response to the command signal the control circuit 12 provides current to drive the motor 14 in either a clockwise or counterclockwise direction depending upon the nature of the command signal. If the command signal is a high voltage, then the control circuit will drive the motor in one direction. If the command signal is a low voltage, the control circuit will drive the motor in the opposite direction. Depending upon whether the motor 14 is driven in a clockwise or counterclockwise direction, the movable switch plate 28 is moved to either open or close switch contact plates 24a, 24b of switch 18. Accordingly, the command circuit operates the control switch 18 of circuit to control a separate high current electrical system.

The separate high current electrical system controlled by switch 18 may be an alternating current circuit, as well as a direct current circuit. The separate high current electrical system also may be a multiphase current circuit, such as a three-phase circuit; in the latter case, however, there would need to be an additional contact plate, and the movable plate 28 would need to be divided into segments, configurations that would be obvious to persons skilled in the field.

It is to be understood that a wide range of changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

We claim:

1. A system for controlling a motor driven switch comprising:
    a switch having at least one switch contact moveable between electrically closed and open positions;
    a reversible direct current motor having a shaft rotatable in first and second opposite rotary directions;
    means connected to said motor shaft for operating said at least one switch contact for electrically opening and closing the switch responsive to rotation of said motor shaft in first and second opposite rotary directions;
    command circuit means responsive to a first condition for generating a first signal and responsive to a second condition for generating a second signal; and
    control circuit means responsive to said first signal for driving said direct current motor shaft in the first rotary direction and responsive to said second signal for driving said direct current motor shaft in the second opposite rotary direction;
    whereby the motor driven switch is controlled between the open and closed positions by electrical signals.

2. The system of claim 1, wherein said at least one switch contact is designed and configured to conduct at least 100 amperes of current.

3. The system of claim 1, wherein said direct current motor is designed and configured to be controlled by less than 20 milliamperes of current.

4. The system of claim 1, wherein the first condition comprises operation of a vehicle ignition, and wherein in response to said first signal the control circuit causes the rotation of the motor shaft to electrically close the switch.

5. The system of claim 1, wherein the second condition is a function of battery charge, and wherein in response to said second signal the control circuit causes the rotation of the motor shaft so as to electrically open said switch.

6. The system of claim 1 in which said command circuit generates a relatively low voltage signal in response to one condition and a relatively high voltage signal in response to another condition.

7. A system for controlling a motor driven switch, comprising:
    a switch adapted to be connected in series with at least one load;
    means for opening and closing said switch including a direct current motor operative to drive a rotary shaft, and means controlled by said rotary shaft for operating said switch between electrically open and closed positions;

first means for generating a first output signal;

second means for generating a second output signal;

timer means responsive to said first output signal for generating a timing output signal a time delay period after said first output signal;

control driver circuitry responsive to said timing output signal for operating said motor in order to open said switch, and responsive to said second output signal for operating said motor in order to close said switch.

8. The system of claim 7 in which said first and second output signals are low and high voltage signals compared to each other.

9. A system for controlling a motor driven switch comprising:

switch means for switching between electrically closed and electrically open positions;

a reversible direct current motor rotatable in clockwise and counterclockwise rotary directions;

means responsive to the rotation of said motor in opposite rotary directions for operating said switch means in order to electrically open and close said switch;

command circuit means responsive to one condition for generating a first command signal and responsive to another condition for generating a second command signal, said command signals being relatively low and high voltage signals compared to each other; and control circuit means responsive to said command signals for driving said direct current motor in clockwise and counterclockwise rotary directions whereby the motor driven switch means is controlled between electrically open and closed positions by electrical signals.

10. The system of claim 9, wherein said switch means is designed and configured to switch a circuit conducting at least about 100 amperes of current.

11. The system of claim 9, wherein said direct current motor is designed and configured to be controlled by less than about 20 milliamperes of current.

* * * * *

UNITED STATES PATENT AND TRADEMARK OFFICE
CERTIFICATE OF CORRECTION

PATENT NO. : 5,296,788
DATED : March 22, 1994
INVENTOR(S) : Arnold L. Betton, et al.

It is certified that error appears in the above-indentified patent and that said Letters Patent is hereby corrected as shown below:

On the title page: Item [54] and Column 1. lines 2 and 3 delete "SYSTEM FOR CONTROLLING A MOTOR DRIVEN SWITCH" and substitute therefor --MOTOR DRIVEN SWITCH CONTROL SYSTEM--.

<u>ON THE REFERENCES CITED</u>   Item [56]

On the title page, column 2, delete U.S. Patent Document "4,285,305 3/1981 Anglis" and substitute therefor --4,258,305 3/1981 Anglin--.

In column 1, delete "SYSTEM FOR CONTROLLING A MOTOR DRIVEN SWITCH" and substitute therefor --MOTOR DRIVEN SWITCH CONTROL SYSTEM--.

Signed and Sealed this

Eighteenth Day of October, 1994

Attest:

BRUCE LEHMAN

*Attesting Officer*                *Commissioner of Patents and Trademarks*